3,373,155
SUBSTITUTED PENICILLINS AND
CEPHALOSPORINS
Bertil Åke Ekström and Berndt Olof Harald Sjöberg,
Sodertalje, Sweden, assignors to Aktiebolaget Astra,
Apotekarnes Kemiska Fabriker, Sodertalje, Sweden
No Drawing. Filed Jan. 11, 1965, Ser. No. 424,811
Claims priority, application Sweden, Jan. 16, 1964,
545/64
10 Claims. (Cl. 260—239.1)

The present invention relates to new antimicrobially active compounds and to the process for their preparation.

Compounds prepared according to the invention have the following general formula

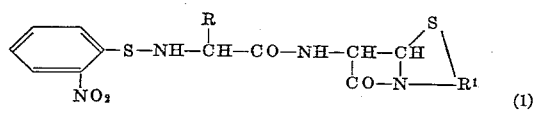

where R is hydrogen or an aliphatic, cycloaliphatic, araliphatic, aromatic or heterocyclic group which may all be unsubstituted or substituted with, for instance, one or several halogen atoms, alkyl, hydroxy, alkoxy, aryloxy, acyloxy, carboxy, alkoxycarbonyl, mercapto, alkylmercapto, nitro, amino and substituted amino, aminoxy, oximino, alkoximino groups or alkyl or aryl substituted sulphoxy or sulphonyl groups, $R^1$ is a bivalent acid residue of the formula

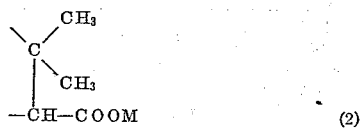

or

where A is hydrogen or a hydroxyl, alkanoyloxy, benzoyloxy group or a quaternary nitrogen atom included in a heterocyclic ring and M is hydrogen, a pharmaceutically useful cation or, when A is a quaternary nitrogen atom, an anionic charge or where A and M together form a univalent carbon-oxygen bond.

The compounds according to the present invention show antimicrobial activity especially against Gram positive microorganisms but also against Gram negative. They are thus useful for treatment of various infections caused by microorganisms.

The compounds may be administered in various formulations, for instance, as solutions, suspensions, tablets, capsules and ointments. They can be given orally, by injection and by topical application according to the nature of the infection to be treated, and they are suitable for treatment of humans as well as of animals.

The compounds according to the invention are suitably prepared by bringing a compound of the general formula

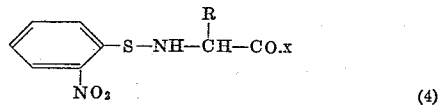

to react with a compound of the general formula

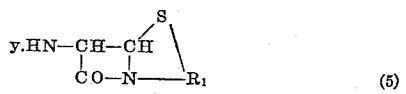

where R is hydrogen or a saturated or unsaturated aliphatic, cycloaliphatic, araliphatic, aromatic or heterocyclic group, which may all be unsubstituted or substituted with, for instance, one or several halogen atoms, alkyl, aryloxy, hydroxy, alkoxy, acyloxy, carboxy, alkoxycarbonyl, alkylmercapto, mercapto, nitro, amino and substituted amino, aminoxy, oximino, alkoximino groups or alkyl or aryl substituted sulphoxy or sulphonyl groups, $R^1$ is a bivalent acid radical of the general formula

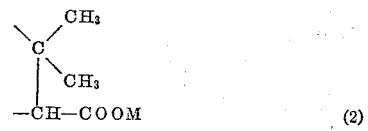

or

where A is hydrogen or a hydroxy, alkanoyloxy, benzoyloxy group or a quaternary nitrogen atom included in a heterocyclic ring and M is hydrogen, a pharmaceutically useful cation or, when A is a quaternary nitrogen atom, an anionic charge or where A and M together form a univalent carbon-oxygen bond, and —CO.x and y.NH— represent atom groups capable to react with each other with the formation of a carbon-nitrogen bond so that, if necessary after hydrolysis, a —CO—NH— bridge is obtained.

In this case —CO.x may be an acid chloride or a functional equivalent such as an acid bromide, an activated ester, anhydride, mixed anhydride with formic esters or carboxylic acids, sulphonic or inorganic acids or derivatives obtained by the reaction between a carboxylic acid and a carbodiimide or similarly functioning compounds such as N,N'-carbonyldiimidazole or N-ethyl-5-phenylisoxazolium-3'-sulphonate. In Formula 5 y may be hydrogen or, for instance, a trialkylsilyl group in which none of the alkyl groups contain more than 5 carbon atoms.

Suitable solvents for performing the reaction are organic solvents or water mixtures thereof. Such solvents are, for instance, benzene, methylene chloride, chloroform, acetone, dimethylformamide, ether, tetrahydrofuran and dioxane.

The acids prepared according to the invention may be used as such or in form of their salts. Suitable salts are non-toxic metal salts such as sodium, potassium, calcium and aluminum salts, ammonium salts and substituted ammonium salts, e.g. salts of such non-toxic amines as trialkylamines, including triethylamine, procaine, dibenzylamine, α-benzyl-β-phenylethylamine, N,N'-dibenzylethylendiamine, dehydroabieylamine, and other amines which have been used to form salts with benzyl- and phenoxymethylpenicillin.

If the compounds of the Formula 4 contain one or more asymmetric centra the resulting derivatives of the Formula 1 may form a mixture of diastereoisomers which are all biologically active. The present invention comprises the diastereoisomers as well as mixtures of them.

The preparation of the compounds according to the present invention is illustrated by the following examples.

*Example 1.*—(*o-Nitrophenylsulphenylamino*)
*methylpenicillin*

N-(o-nitrophenylsulphenyl)glycine (2.3 g., 0.01 mole) was dissolved in dimethylformamide (30 ml.) together with triethylamine (1.0 g., 0.01 mole). Ethyl chloroformate (1.1 g., 0.01 mole), dissolved in ether (5 ml.) was added dropwise with stirring at —10° C. After 20 minutes dry, ice-cold acetone (30 ml.) was added, immediately followed by an ice-cold solution of 6-aminopenicillanic acid (2.2 g., 0.01 mole) and triethylamine (1.1 g., 0.11 mole) in water (30 ml.), whereafter stirring was continued for 90 minutes without external cooling. After dilution with water the reaction mixture was well washed with ether, acidified to pH 2 with dilute sulphuric acid and rapidly extracted with ether (2×50 ml.). The combined ether layers were washed twice with water (discarded) and the formed penicillin was extracted with an N potassium bicarbonate solution (8.5 ml.). The neutral aqueous phase thus obtained was washed with ether and freeze-dried at which the potassium salt of N-o-nitrophenylsulphenyl-aminomethylpenicillin (2.5 g.) with a purity of 62% (hydroxylamine assay) was obtained as a yellow powder.

This product inhibited the growth of *Staph. aureus*, Oxford at a concentration of 0.25 mcg./ml. and contained in its IR-spectrum a strong band at 1770 cm.$^{-1}$, showing the presence of a β-lactam ring.

N-(o-nitrophenylsulphenyl)glycine, used as starting material above, was prepared according to: J. Goerdeler and A. Holst; Angew. Chem. 71 (1959), 775.

*Example 2.—α-(o-Nitrophenylsulphenylamino) benzylpenicillin*

α-N-(o-nitrophenylsulphenyl)phenylglycine (6.1 g., 0.02 mole) and triethylamine (2 g., 0.02 mole) were dissolved in dry dimethylformamide (75 ml.), cooled to −10° C. and treated, dropwise with stirring, with ethyl chloroformate (2.2 g., 0.01 mole), dissolved in dry ether (5 ml.). After 20 minutes an ice-cold solution of 6-aminopenicillanic acid (5.4 g., 0.025 mole) and triethylamine (2.8 g., 0.028 mole) in water (50 ml.), was added all at once and stirring was continued for 90 minutes without external cooling. The reaction mixture was diluted with water (100 ml.), washed well with ether, acidified to pH 3 with diluted sulphuric acid, and rapidly extracted with ether (3×100 ml.). The combined ether layers were washed with water and the penicillin was extracted by the addition of an N potassium bicarbonate solution until the pH of the aqueous phase was 7. After washing with ether, the aqueous solution was freeze-dried at which 7.49 g. of the potassium salt of α-(o-nitrophenylsulphenylamino) benzylpenicillin were obtained as a yellow powder with a purity of 84% (hydroxylamine assay).

This product inhibited the growth of *Staph. aureus*, Oxford at a concentration of 0.13 mcg./ml. and contained in its IR-spectrum a strong band at 1760 cm.$^{-1}$, characteristic for a β-lactam ring.

The starting material, α-N-(o-nitrophenylsulphenyl) phenylglycine, M.P. 149–50° C. (decomposition) (found: C, 53.6; H, 3.84; N, 8.99; S, 10.44. Calc. for $C_{14}H_{12}N_2O_4S$: C, 55.25; H, 3.98; N, 9.20; S, 10.54) was obtained by treating α-aminophenylacetic acid with o-nitrophenylsulphenylthiocyanate in 50% dioxane at pH 7. The acid was isolated by extraction at pH 3 and recrystallized from carbon tetrachloride.

*Example 3.—α-(o-Nitrophenylsulphenylamino)-3-thienylpenicillin*

α-Amino-3-thienylacetic acid (3.2 g., 0.02 mole) in 50% dioxane (80 ml.) was treated with stirring and ice-cooling with a solution of o-nitrophenylsulphenylthiocyanate (4.2 g., 0.02 mole) in dry dioxane (20 ml.) while the pH of the reaction mixture was kept at 7 by the addition of 2 N sodium hydroxide. When the consumption of alkali had ceased, the reaction mixture was diluted with water (100 ml.) and well washed with ether. After acidification to pH 3 with dilute sulphuric acid the α-(o-nitrophenylsulphenylamino)-3-thienylacetic acid was extracted with ether and was obtained as a yellow semi-solid after washing of the combined ether layers with water, drying them and evaporation of the ether in vacuo. The acid (4.1 g., 0.013 mole) was dissolved in dry dimethylformamide (50 ml.) together with triethylamine (1.3 g., 0.013 mole), stirred and cooled to −10° C. and treated dropwise with ethyl chloroformate (1.4 g., 0.013 mole) dissolved in dry ether (5 ml.). After 20 minutes an ice-cold solution of 6-aminopenicillanic acid (4.3 g., 0.02 mole) and triethylamine (2.2 g., 0.022 mole) in water (30 ml.) was added all at once and stirring was continued for 2 hours without external cooling. The reaction mixture was diluted with water (100 ml.) and washed well with ether, acidified to pH2 and rapidly extracted with ether (3×100 ml.). The combined ether layers, containing the free penicillin, were washed with water and extracted with an N potassium bicarbonate solution until the aqueous phase was neutral. This was washed with ether and freeze-dried at which the potassium salt of α - (o - nitrophenylsulphenylamino)-3-thienylpenicillin (3.9 g.) was obtained with a purity of 58% (hydroxylamine assay).

This product inhibited the growth of *Staph. aureus*, Oxford at a concentration of 0.25 mcg./ml. and contained in its IR-spectrum a strong band at 1770 cm.$^{-1}$, showing the presence of a β-lactam ring.

In the manner described in the preceding examples, the following penicillins were prepared, which all contained in their IR-spectra absorption bands around 1760–1770 cm.$^{-1}$, showing the presence of a β-lactam ring. The purities (hydroxylamine assay) and minimum inhibitory concentrations (MIC) against *Staph. aureus*, Oxford of the compounds are given in the table:

| | Purity, Percent | MIC, mcg./ml. |
|---|---|---|
| α-(o-Nitrophenylsulphenylamino)ethyl-penicillin | 77 | 0.63 |
| α-(o-Nitrophenylsulphenylamino)-β-phenylethylpenicillin | 47 | 0.25 |
| β-(o-Nitrophenylsulphenylamino)ethyl-penicillin | 64 | 0.63 |
| γ-(o-Nitrophenylsulphenylamino)propyl-penicillin | 38 | 1.25 |

By reacting N-(o-nitrophenylsulphenyl)glycine and N-(o-nitrophenylsulphenyl)phenylglycine with 7-aminocephalosporanic acid in the manner described in Examples 1 and 2 the following compounds may be obtained (MIC indicates the minimum inhibiting concentration against *Staph. aureus*, Oxford).

MIC mcg./ml.

α - (o - Nitrophenylsulphenylamino) - methylcephalosporin _____ 6.25

α - (o - Nitrophenylsulphenylamino) - benzylcephalosporin _____ 1.25

*Example 4.—D-[α-(o-nitrophenylsulphenylamino)-α-phenylacetamido]penicillanic acid*

To a stirred solution of the triethylamine salt of D-α-(o-nitrophenylsulphenylamino)-α-phenylacetic acid (3.4 g., 0.0084 mole) in 40 ml. of dry dimethylformamide, at −10° C., ethyl chloroformate (0.89 g., 0.0085 mole) dissolved in 3 ml. of dry ether, was added dropwise during 10 minutes. After another 10 minutes an ice-cold solution of 6-aminopenicillanic acid (2.2 g., 0.01 mole) and triethylamine (1 g., 0.01 mole) in 40 ml. of water was rapidly added. The cooling bath was removed and the stirring continued for 90 minutes, after which the reaction mixture was washed with ether, acidified to pH 2 and extracted three times with ether. The combined ether extracts were washed with water and extracted with N potassium bicarbonate solution till the aqueous phase was neutral. Freeze-drying of the latter gave 2.2 g. of the potassium salt of D-[α-(o-nitrophenylsulphenylamino)-α-phenylacetamido]penicillanic acid with a purity of 120% (hydroxylamine assay with 6-aminopenicillanic acid as standard.

The product was found to inhibit the growth of *Staph. aureus*, Oxford at a concentration of 0.13 mcg./ml.

D - [α - (o-nitrophenylsulphenylamino)-α-phenylacetic] acid (found: S, 10.6. Calculated for $C_{14}H_{12}N_2O_4S$: S, 10.54%) was obtained by treatment of D-α-aminophenylacetic acid with o-nitrophenylsulphenyl thiocyanate in 50% dioxane at pH 7. The triethylamine salt was obtained by treating the acid in ether with an equivalent amount of triethylamine.

*Example 5.*—α-(*o-Nitrophenylsulphenylamino*)-γ-thio-methylpropylpenicillin

To a mixture of N-(o-nitrophenylsulphenyl)-methionine (10 g., 0.033 mole) and triethylamine (3.3 g., 0.033 mole) in 75 ml. of dry dimethylformamide at −10° C., ethyl chloroformate (3.5 g., 0.033 mole) was added dropwise with stirring during 10 minutes. After another 10 minutes an ice-cold solution of 6-aminopenicillanic acid (87 g., 0.04 mole) and triethylamine (4.6 g. 0.045 mole) in 75 ml. of water was added all at once. The cooling bath was removed and the stirring was continued for two hours, whereafter the reaction mixture was washed with ether, acidified to pH 2 and extracted three times with ether. The combined organic extracts were washed with water and extracted with N potassium bicarbonate solution till the aqueous phase was neutral. The aqueous solution as freeze-dried to give 6.3 g. of the potassium salt of α - (o - nitrophenylsulphenylamino)-γ-thiomethylpropylpenicillin with a purity of 104% (hydroxylamine assay with 6-aminopenicillanic acid as standard).

The product was found to inhibit the growth of *Staph. aureus*, Oxford at a concentration of 0.25 mcg./ml.

N-(o-nitrophenylsulphenyl)-methionine, M.P. 140° C. (decomposition) (found: C, 43.2; H, 4.45; N, 9.20. Calculated for $C_{11}H_{14}N_2O_4S_2$: C, 43.69; H, 4.67; N, 9.27%) was obtained by treating methionine in 75% dioxane at pH 9 with o-nitrophenylsulphenyl chloride. The acid was isolated after acidification and extraction with ether.

*Example 6.*—α,m-Di(*o-nitrophenylsulphenylamino*)benzylpenicillin

To α,m - di(o-nitrophenylsulphenylamino)phenylacetic acid (7.5 g., 0.016 mole) and triethylamine (1.62 g., 0.016 mole) in 75 ml. of dry dimethylformamide a solution of ethyl chloroformate (1.7 g., 0.016 mole) in 5 ml. dry ether was added dropwise with stirring at −15° C. The addition took 10 minutes and after another 10 minutes an ice-cold solution of 6-aminopenicillanic acid (4.3 g., 0.02 mole, and triethylamine (2.1 g., 0.021 mole) in 50 ml. of water was rapidly added. After removal of the cooling bath the mixture was stirred for 2 hours and was then washed with ether, acidified to pH 2 and extracted three times with ether. The combined ether extracts were washed with water and extracted with N potassium bicarbonate solution till the aqueous phase was neutral. The latter was freeze-dried to give 2.3 g. of the potassium salt of α,m-di(o-nitrophenylsulphenylamino)benzylpenicillin as a yellow powder with a purity of 44% (hydroxylamine assay with potassium benzylpenicillinate as standard).

The product was found to inhibit the growth of *Staph. aureus*, Oxford at a concentration of 0.63 mcg./ml.

α,m-Di(o-nitrophenylsulphenylamino)penylacetic acid was obtained by treating α,m-diaminophenylacetic acid in 75% dioxane with three equivalents of o-nitrophenylsulphenyl chloride. The acid was extracted with ether after acidification to pH 3 and precipitated as its dicyclohexylamine salt, which was recrystallized from methanol, M.P. 190° C. (decomposition). (Found: C, 58.7; H, 6.03; N, 10.4; S, 9.81. Calculated for $C_{32}H_{38}N_5O_6S_2$: C, 58.88; H, 5.87; N, 10.23; S, 9.80%.) The free acid was obtained by treating the salt with dilute hydrochloric acid and extracting with ether. The product obtained after evaporation of the ether was used directly for the coupling with 6-APA.

*Example 7.*—δ-(*o-Nitrophenylsulphenylamino*)butylpenicillin

δ-(o-Nitrophenylsulphenylamino)valeric acid, obtained from its dicyclohexylamine salt (13.5 g., 0.03 mole) by acidification and extraction with ether and triethylamine (3 g., 0.03 mole) were dissolved in 100 ml. of dry dimethylformamide. Ethyl chloroformate (3.1 g., 0.03 mole) was added dropwise during 10 minutes while stirring and cooling to −10° C. After another 10 minutes an ice-cold solution of 6-aminopenicillanic acid (7.1 g., 0.035 mole) and triethylamine (3.6 g., 0.036 mole) in 75 ml. of water was rapidly added and stirring was continued for two hours at room temperature. The reaction mixture was washed with ether, acidified to pH 2 and extracted three times with ether. The combined ether extracts were washed with water and extracted with 0.1 N potassium bicarbonate solution till the aqueous phase was neutral. The aqueous solution was freeze-dried to give 10.5 g. of the potassium salt of δ-(o-nitrophenylsulphenylamino)butylpenicillin with a purity of 65% (hydroxylamine assay with potassium benzylpenicillinate as standard).

The product was found to inhibit the growth of *Staph. aureus*, Oxford at a concentration of 0.63 mcg./ml.

δ-(o-Nitrophenylsulphenylamino)valeric acid was obtained by treatment of δ-aminovaleric acid in 75% dioxane at pH 9 with o-nitrophenylsulphenyl chloride. The acid was extracted with ether after acidification to pH 3. Addition of dicyclohexylamine to the washed and dried ether phase gave the dicyclohexylamine salt of the acid, M.P. 115° C. (decomposition). (Found: C, 61.1; H, 8.26; N, 9.47; S, 7.11. Calculated for $C_{23}H_{37}N_3O_4S$: C, 61.16; H, 8.26; N, 9.30; S, 7.10%.)

*Example 8.*—α-(*o-Nitrophenylsulphenylamino*)-β-methylbutylpenicillin

α-(o-Nitrophenylsulphenylamino)-β-methylvaleric acid, obtained by acidification and extraction of its dicyclohexylamine salt (14 g., 0.03 mole) was dissolved in 60 ml. of dry dimethylformamide. Triethylamine (3 g., 0.03 mole) was added, followed by ethyl chloroformate (3.1 g., 0.03 mole)—dissolved in 5 ml. of dry ether—dropwise while stirring and cooling to −10° C. 10 minutes after that all of the chloroformate had been added, an ice-cold solution of 6-aminopenicillanic acid (7.1 g., 0.035 mole) and triethylamine (3.6 g., 0.036 mole) in 100 ml. of water was rapidly added. After stirring at room temperature for two hours, the reaction mixture was washed with ether, acidified to pH 2 and extracted three times with ether. The combined ether extracts were washed with water and extracted with N potassium bicarbonate solution till the aqueous phase was neutral. The latter was freeze-dried to give 3.6 g. of the potassium salt of α-(o-nitrophenylsulphenylamino)-β-methylbutylpenicillin as a yellow powder with a purity of 84% (hydroxylamine assay with potassium benzylpenicillinate as standard).

The product was found to inhibit the growth of *Staph. aureus*, Oxford at a concentration of 0.63 mcg./ml.

Treatment of DL, DL-allo-isoleucin in 75% dioxane at pH with o-nitrophenylsulphenyl chloride gave α-(o-nitrophenylsulphenylamino) - β-methylvaleric acid, which was extracted with ether after acidification of the reaction mixture. Addition of dicyclohexylamine to the washed and dried ether solution gave the corresponding salt, M.P. 185–6° C. (from methanol). (Found: C, 61.7; H, 8.52; N, 9.05; S, 6.87. Calculated for $C_{24}H_{39}N_3O_4S$: C, 61.91; H, 8.44; N, 9.02; S, 6.89%.)

In the way described in the preceeding examples the following penicillins were prepared, for which the purities (hydroxylamine assay) and minimum inhibitory concentrations (MIC) against *Staph. aureus*, Oxford are given:

|  | Purity, Percent | MIC, mcg./ml. |
|---|---|---|
| α(o-Nitrophenylsulphenylamino)-γ-carboxamidopropylpenicillin | 87 | 0.63 |
| ε-(o-Nitrophenylsulphenylamino)-pentylpenicillin | 76 | 0.25 |

*Example 9.*—(*2,4-dinitrophenylsulphenylamino*)methylpenicillin

N-2,4-dinitrophenylsulphenylglycerine (6.5 g., 0.025 mole) was dissolved in 150 ml. of dry dimethylformamide together with triethylamine (2.5 g., 0.025 mole). Ethylchloroformate (2.7 g., 0.025 mole) was added dropwise during 10 minutes while stirring and cooling to −10°

C. After another 10 minutes an ice-cold solution of 6-aminopenicillanic acid (6.5 g., 0.03 mole) and triethylamine (3.3 g., 0.033 mole) in 75 ml. of water was rapidly added. Stirring was continued for two hours and then the reaction mixture was washed with ether, acidified to pH 2 and extracted three times with ether. The combined extracts were washed with water and shaken with a dilute potassium bicarbonate solution till the aqueous phase was neutral. Freeze-drying of the aqueous phase gave 8.0 g. of the potassium salt of (2,4-dinitrophenylsulphenylamino)methylpenicillin with a purity of 111% (hydroxylamine assay with 6-aminopenicillanic acid as standard).

The product contained in its IR-spectrum a strong band at 1770 cm.$^{-1}$, showing the presence of a $\beta$-lactam ring and was found to inhibit the growth of Staph. aureus, Oxford at a concentration of 0.63 mcg./ml.

N-(2,4-dinitrophenylsulphenyl)glycine, M.P. 145-7° C. (decomposition). (Found: S, 11.6. Calculated for $C_8H_7N_3O_6S$: S, 11.74%) was obtained by treating glycine in 75% dioxane at pH 9 with 2,4-dinitrophenylsulphenyl thiocyanate It was isolated by extraction with ether after acidification to pH 3.

*Example 10.—α-(2,4-dinitrophenylsulphenylamino) ethylpenicillin*

N-2,4-dinitrophenylsulphenylalanine (2.1 g., 0.0073 mole) and triethylamine (0.74 g., 0.0073 mole) in 50 ml. of dry dimethylformamide were stirred at —10° C. and treated dropwise with ethyl chloroformate (0.8 g., 0.0073 mole), dissolved in a small volume of dry ether. After 15 minutes an ice-cold solution of 6-aminopenicillanic acid (2.2 g., 0.01 mole) and triethylamine (1.1 g., 0.011 mole) in 30 ml. of water was rapidly added and stirring was continued for two hours at room temperature. 10 ml. N potassium bicarbonate solution was added and the mixture was washed with ether, acidified to pH 2 with dilute hydrochloric acid and extracted with ether. The combined ether extracts were washed with water and extracted with N potassium bicarbonate solution till the aqueous phase was neutral. Freeze-drying of the aqueous solution gave 3.2 g. of the potassium salt of α-(2,4-dinitrophenylsulphenylamino)ethylpenicillin as a yellow powder with a purity of 102% (hydroxylamine assay with 6-aminopenicillanic acid as standard).

The product contained in its IR-spectrum a strong band at 1770 cm.$^{-1}$, showing the presence of a $\beta$-lactam ring and was found to inhibit the growth of Staph. aureus, Oxford at a concentration of 0.13 mcg./ml.

N-2,4-dinitrophenylsulphenylalanine, M.P. 157-9° C. (decomposition). (Found: S, 11.2. Calculated for $C_9H_9N_3O_6S$: S, 11.16%) was obtained by treating alanine in 75% dioxane at pH 9 with 2,4-dinitrophenylsulphenyl thiocyanate. The compound was isolated by extraction with ether after acidification to pH 3.

*Example 11.—(o-Nitrophenylsulphenylamino) methylcephalosporin*

N-(o-nitrophenylsulphenyl)glycine (0.084 g., 0.00037 mole) and triethylamine (0.037 g., 0.00037 mole) in 1 ml. of dry dimethylformamide were stirred and chilled to —15° C. and cautiously treated with ethyl chloroformate (0.041 g., 0.0037 mole). After 15 minutes an ice-cold solution of 7-aminocephalosporanic acid (0.1 g., 0.00037 mole) and triethylamine (0.04 g., 0.0004 mole) in 1 ml. of water was rapidly added and stirring was continued for 90 minutes at room temperature, N potassium bicarbonate solution being added to obtain a homogenous solution. 4 ml. of water was added and the mixture was washed with ether, acidified to pH 2 and extracted three times with ether. The combined ether extracts were washed with water and extracted with 0.1 N potassium bicarbonate solution till the aqueous phase was neutral. The latter was separated and evaporated to dryness in vacuo at 25° C. After keeping the residue in a vacuum dessicator over phosphorus pentoxide over night 0.187 g. of the potassium salt of (o-nitrophenylsulphenylamino)methylcephalosporin was obtained.

The product contained in its IR-spectrum characteristic bands for a $\beta$-lactam ring (1770 cm.$^{-1}$), an acetoxy group [1730 (forming a broad band 1770-1710 cm.$^{-1}$ with the $\beta$-lactam absorption), 1230 and 1030 cm.$^{-1}$], a secondary amide (1670, 1510 cm.$^{-1}$), and a carboxylate ion (1600 cm.$^{-1}$). It was found to inhibit the growth of Staph. aureus, Oxford at a concentration of 6.25 mcg./ml. and the growth of Staph. pyogenes A. (penicillin resistant strain) at a concentration of 12.5 mcg./ml.

N-(o-nitrophenylsulphenyl)glycine was prepared according to J. Goerdeler and A. Holst, Angew. Chem. 71 (1959), 775.

*Example 12.—α-(o-Nitrophenylsulphenylamino)benzylcephalosporin*

By substituting α - N - (o-nitrophenylsulphenyl)phenylglycine (0.113 g., 0.00037 mole) for N-(o-nitrophenylsulphenyl)glycine in Example 11, but otherwise performing the same operations as described there, 0.098 g. of the potassium salt of α-(o-nitrophenylsulphenylamino)benzylcephalosporin was obtained.

The product contained in its IR-spectrum characteristic bands for a $\beta$-lactam ring (1770 cm.$^{-1}$), an acetoxy group [1740 (shoulder on the 1770-absorption), 1230 and 1030 cm.$^{-1}$], a secondary amide (1660, 1510 cm.$^{-1}$) and a carboxylate ion (1600 cm.$^{-1}$). It was found to inhibit the growth of Staph. aureus, Oxford at a concentration of 1.25 mcg./ml. and the growth of Staph. pyogenes A. (penicillin resistant strain) at a concentration of 1.25 mcg./ml.

α - N - (o-nitrophenylsulphenyl)phenylglycine was prepared as described in Example 2.

We claim:
1. Antimicrobially active compounds of the general formula:

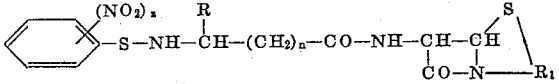

wherein R is a radical selected from the group consisting of hydrogen, lower alkyl, monocarbocyclic aryl, lower alkyl-substituted monocarbocyclic aryl, sulfur-heterocyclic radicals containing from 4 to 7 ring members, mercaptoalkyl, lower alkyl-substituted mercaptoalkyl, lower alkylamide, and nitrophenyl-sulfenyl-amino-substituted monocarbocyclic aryl radicals; $R_1$ is a radical selected from the group consisting of:

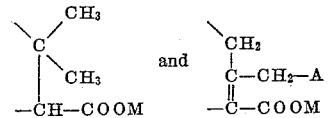

wherein A is a radical selected from the group consisting of hydrogen, 1-pyridinium, alkanolyoxy, and benzoyloxy radicals; and M is a radical selected from the group consisting of hydrogen, and pharmaceutically useful, nontoxic cations forming salts with the substituted penicillanic and cephalosporanic acids; said $NO_2$ radical is attached to the phenyl radical at a position selected from positions 2 and 4, z is an integer from 1 to 2; and n is an integer from 0 to 4.

2. Antimicrobially active compounds of the general formula:

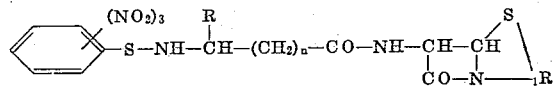

wherein R is a radical selected from the group consisting of hydrogen, lower alkyl, monocarbocyclic aryl, lower alkyl-substituted monocarbocyclic aryl, sulfur-heterocyclic radicals containing from 4 to 7 ring members, mercaptoalkyl, lower alkyl-substituted mercaptoalkyl, lower alkylamide, and nitrophenyl-sulfenyl-amino-substituted monocarbocylic aryl radicals; $R_1$ is a radical selected from the group consisting of:

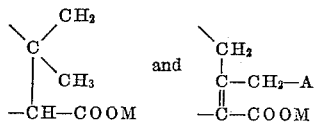

wherein A is a radical selected from the group consisting of hydrogen, 1-pyridinium, alkanoyloxy, and benzoyloxy radicals; and M is a radical selected from the group consisting of hydrogen, and pharmaceutically useful, nontoxic cations forming salts with substituted penicillanic and cephalosporanic acids; said

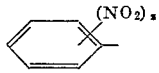

group is selected from the group consisting of 2-nitrophenyl and 2,4-dinitrophenyl groups; and $n$ is an integer from 0 to 4.

3. Antimicrobially active compounds as set forth in claim 1, wherein $R_1$ is a radical of the general formula:

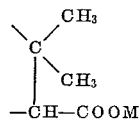

wherein M has the same meaning as in claim 1.

4. Antimicrobially active compounds as set forth in claim 1, wherein $R_1$ is a radical of the general formula:

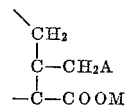

wherein A and M have the same meaning as in claim 1.

5. Antimicrobially active compounds as set forth in claim 1, wherein R is phenyl.

6. Antimicrobially active compounds as set forth in claim 1, wherein R is lower alkyl.

7. Antimicrobially active compounds as set forth in claim 1, wherein R is carboxamide.

8. Antimicrobially active compounds as set forth in claim 1, wherein R is m-(o-nitro-phenyl-sulfenylamino) phenyl.

9. Antimicrobially active compounds as set forth in claim 1, wherein R is thienyl.

10. Antimicrobially active compounds as set forth in claim 1, wherein R is benzyl.

References Cited

UNITED STATES PATENTS 2,951,839  9/1960  Doyle et al. _____ 260—239

NICHOLAS S. RIZZO, *Primary Examiner.*

UNITED STATES PATENT OFFICE
CERTIFICATE OF CORRECTION

Patent No. 3,373,155  March 12, 1968

Bertil Åke Ekström et al.

It is certified that error appears in the above identified patent and that said Letters Patent are hereby corrected as shown below:

Column 5, line 17, "as" should read -- was --. Column 6, line 71, "N-2,4-dinitrophenylsulphenylglycerine" should read -- N-2,4-dinitrophenylsulphenylglycine --. Column 8, line 56, "alkanolyoxy" should read -- alkanoyloxy --; line 67, "$(NO_2)_3$" should read -- $(NO_2)_z$ --; line 69 "$_1R$" should read -- $R_1$ --. Column 9, line 4, "$CH_2$" should read -- $CH_3$ --.

Signed and sealed this 12th day of August 1969.

(SEAL)
Attest:

Edward M. Fletcher, Jr.
Attesting Officer

WILLIAM E. SCHUYLER, JR.
Commissioner of Patents